Dec. 10, 1963　　　　WEN HAN LI　　　　3,113,843
APPARATUS FOR SEPARATING A VAPOR FROM A VISCOUS
MATERIAL SUCH AS MOLTEN POLYMER
Filed Jan. 27, 1959　　　　　　　　　　　　　3 Sheets-Sheet 1
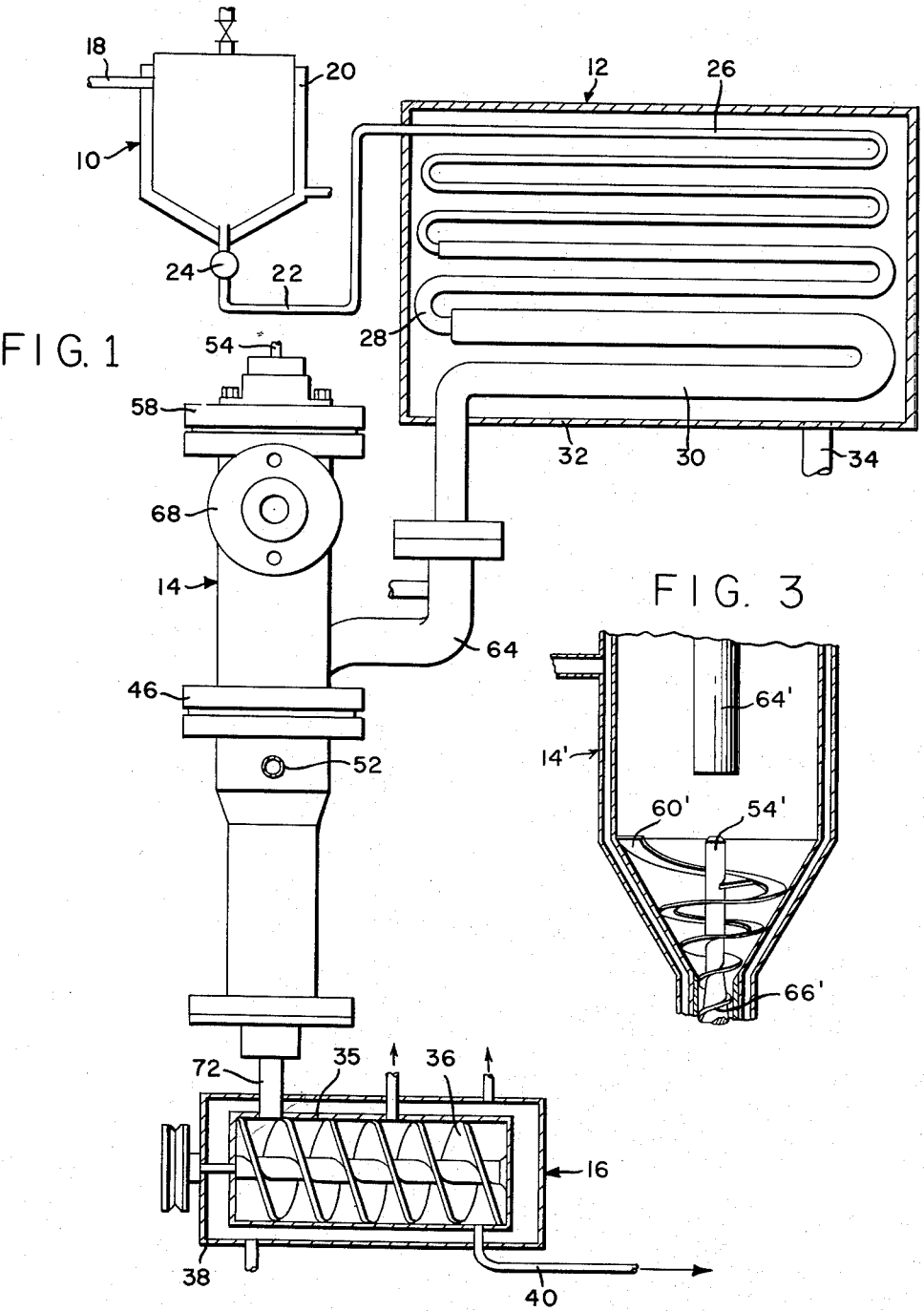

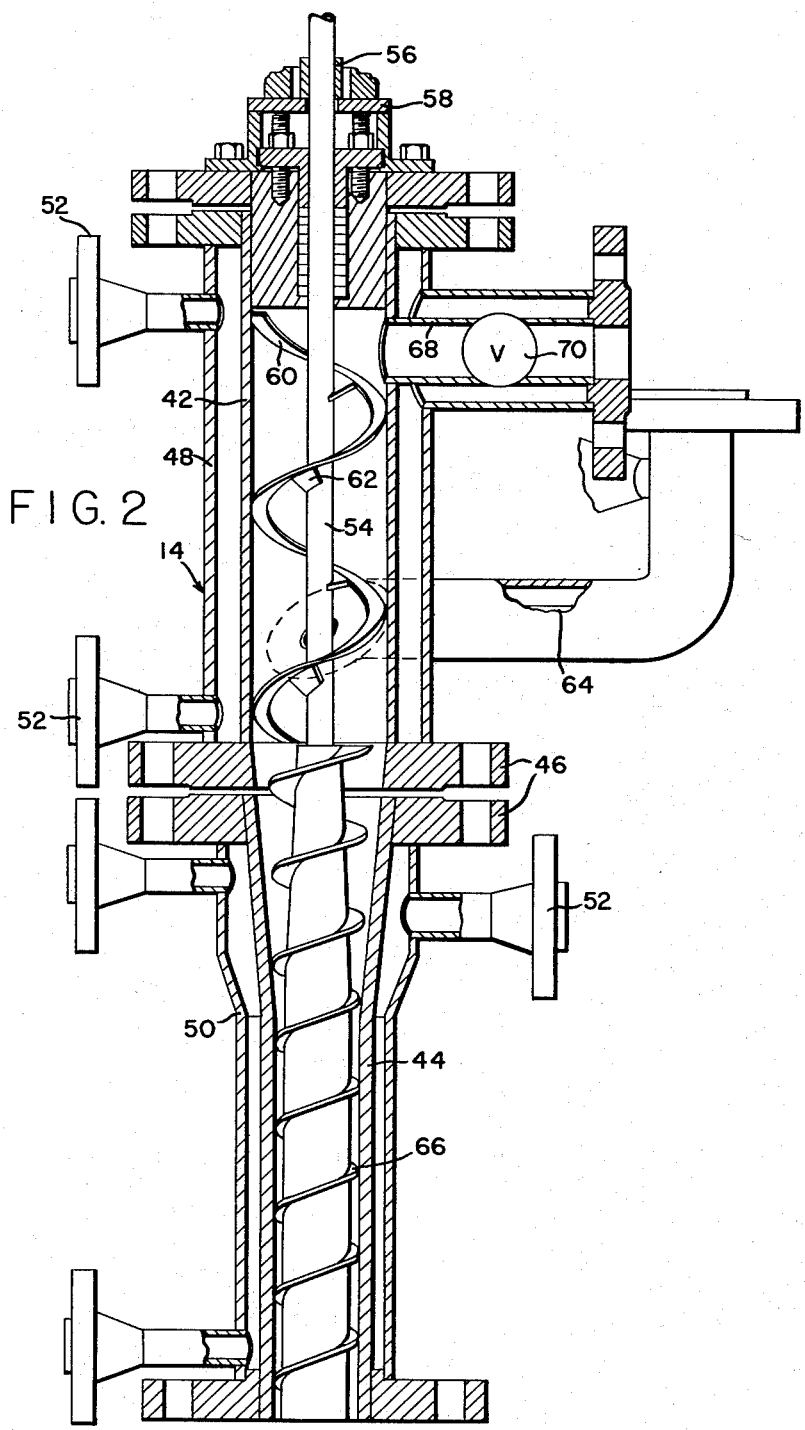

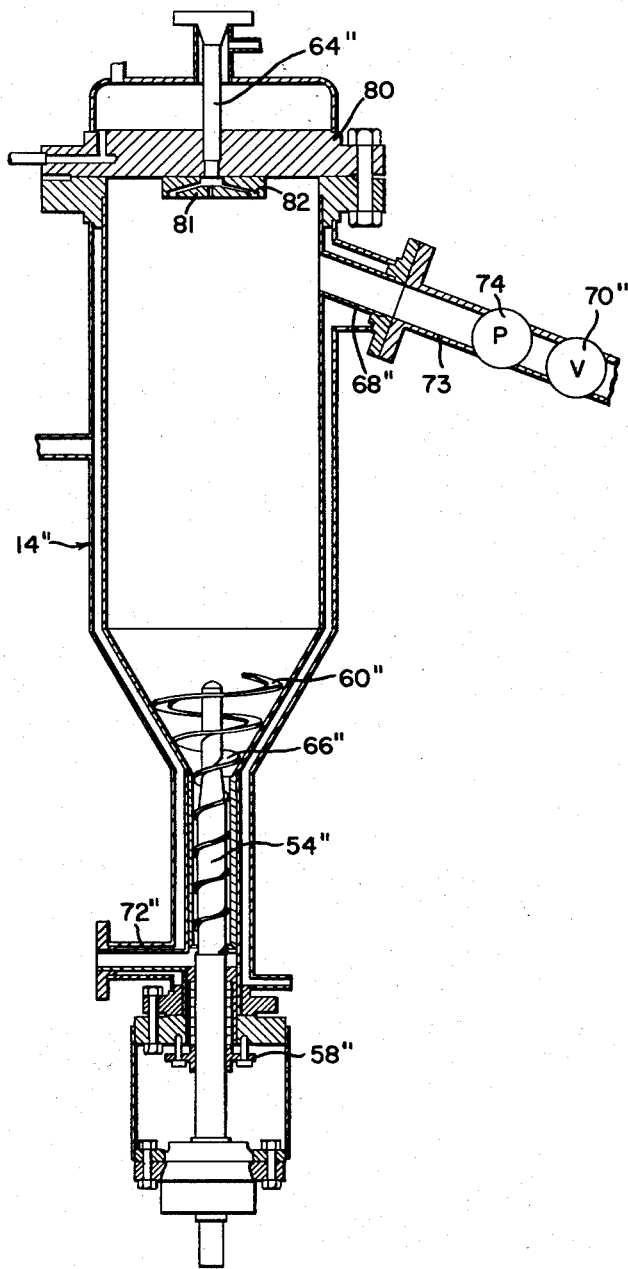

United States Patent Office 3,113,843
Patented Dec. 10, 1963

1

3,113,843
APPARATUS FOR SEPARATING A VAPOR FROM A VISCOUS MATERIAL SUCH AS MOLTEN POLYMER
Wen Han Li, Chattanooga, Tenn., assignor to E. I. du Pont de Nemours and Company, Wilmington, Del., a corporation of Delaware
Filed Jan. 27, 1959, Ser. No. 789,423
10 Claims. (Cl. 23—285)

This invention relates generally to the production of synthetic polymeric materials and, more specifically, to an apparatus useful in producing high viscosity polyamides in a continuous process.

Synthetic polyamides have achieved a notable degree of commercial importance, particularly those which exhibit fiber-forming properties. Such polymers are the linear condensation products of bifunctional amide-forming monomers, and are prepared from these reactants by continued heating with concomitant removal of the volatile by-products of the condensation reaction until the desired degree of polymerization is attained, as indicated, for example, by viscosity measurements. Fiber-forming polyamides can be drawn or spun from the melt into filaments which, when further "cold drawn," form tenacious, crystalline structures having characteristic X-ray diffraction patterns indicative of molecular orientation along the filament axis.

Fiber-forming polyamides may be prepared more economically, uniformly, and with less handling in a continuous process rather than by the batchwise procedures disclosed by Carothers in U.S. Patents 2,071,250, 2,071,253, 2,130,948 and 2,190,770. A suitable process for polymerizing continuously is disclosed in U.S. Patent 2,361,717 to Taylor. Another apparatus useful for the same purpose is shown in U.S. Patent 2,689,839 to Heckert. In each case, a concentrated aqueous solution of the amide-forming reactants, e.g., a diaminedicarboxylic acid salt, is supplied continuously to a reactor wherein the temperature-pressure conditions are such that formation of steam is prevented and a major portion of the salt is converted to polymer. The reaction mass is then supplied to a flasher, e.g., a tubular reaction vessel having progressively increasing diameter, wherein amidation temperatures are maintained with a gradual pressure reduction, thus permitting the separation of water from the reaction mass as steam. Finally, the polymer is fed continuously to a heated finisher, wherein the polymerization is completed, i.e., the desired degree of polymerization is obtained.

The degree of polymerization, as indirectly expressed in terms of polymer viscosity, is controlled in the finishing step. At elevated temperatures, the degree of polymerization is a function of and is limited by the amount of water present, by virtue of the dynamic equilibrium involving polymer and water on the one hand, and depolymerized polymer or even the reactants on the other. Recently, polyamides having a viscosity considerably higher than that attainable through equilibration with steam at atmospheric pressure have been required. Such polymers are used to prepare higher tenacity industrial yarn having improved fatigue and growth properties. In order to prepare such polymer, the partial pressure of steam in the finishing step must be reduced.

The partial pressure of steam is reduced conventionally during finishing either by the use of an inert atmosphere or by finishing under partial vacuum. However, since the polymer melt from the flasher contains considerable amounts of moisture as steam, finishing to relatively high viscosities, e.g., 50% greater than the attainable through steam equilibrium, is a very expensive operation, either in terms of inert gas consumption or facilities necessary to produce prolonged partial vacuum. In addition, the increased time necessary to produce high viscosity polymer from the steam-laden material supplied from the flasher often leads to gelled or otherwise degraded polymer.

It is therefore the most important object of this invention to provide a substantially steam-free supply of a molten polyamide to the finishing step in an otherwise conventional continuous polymerization process.

A further object is the provision of apparatus for separating steam from a supply of molten fiber-forming polyamide, which apparatus has uniform throughput characteristics achieved with a minimum of polymer holding.

An additional object of the present invention is to provide a steam-polymer separator having streamlined internal flow lines so that polymer passing continuously therethrough is not subject to gelation, degradation and other forms of stagnation, which separator has uniform output characteristics with the polymer itself providing an adequate seal for the outlet of the separator.

With these and other objects in view, the steam-polymer separator of the present invention comprises generally an upright tubular column having, from top to bottom, a cylindrical separating zone, a frusto-conical feed zone, and a reduced diameter cylindrical transfer zone, with transfer means in the column for moving the polymer through the separator. Additional advantageous features will be apparent in the description which follows, reference being had to the accompanying drawings, wherein:

FIGURE 1 is a schematic illustration of a continuous polymerization system which includes the steam-polymer separator of the present invention;

FIG. 2 is a vertical section taken through the steam separator shown in FIG. 1;

FIG. 3 is a fragmentary vertical section of a second embodiment of the steam separator; and FIG. 4 is a vertical sectional view of a third embodiment of the apparatus of this invention.

The continuous polymerization system illustrated schematically in FIG. 1 includes a first reactor 10 in which an aqueous polyamide-forming composition is partially polymerized at amidation pressure and temperature; a second reactor 12 wherein polymerization continues at amidation temperature with a reduction in pressure; a steam-polymer separator 14; and a finisher 16. Except for the addition of separator 14, the system is similar to that disclosed in the Heckert patent.

The reactor 10 is supplied with amide-forming reactants through inlet pipe 18 and is heated by the introduction of hot vapor to jacket 20. Such heating initiates the polymerization reaction. The partially polymerized material is withdrawn from reactor 10 through pipe 22 and forced by pump 24 into the second reactor or flasher 12.

As illustrated, the flashing reactor 12 includes three sections 26, 28, 30 of tubing which are series connected and of successively increased diameter. The tubes 26–30 are surrounded by a heating jacket 32 to which heating fluid is supplied through pipe 34. From the tube 30, the reaction products are passed to steam separator 14 and thence to finisher 16.

The finisher 16 includes a tube 35 having therein a screw conveyor 36. Polymer passing through the tube 35 is heated by the introduction of hot vapors into jacket 38 and is discharged through a transfer conduit 40 to a melt extrusion device or the like.

The constructional details of the steam separator 14 of the present invention are best shown in FIG. 2 wherein it is seen that the separator column includes an upper tubular member 42 and a lower tubular member 44 which are joined by flanges, as indicated at 46. The members 42, 44 are surrounded by heating jackets 48, 50, each of which is equipped with supply and return nozzles 52 in communication with an external supply of a suitable heat transfer medium. A shaft 54 extends lengthwise through the separator 14 and, at its upper end, is journaled in bearings 56 forming part of a support assembly 58 which closes off the upper end of tubular member 42 and heating jacket 48.

Within the tubular member 42, a ribbon flight 60 spirals around shaft 54 and is attached thereto by spokes 62. The length of shaft 54 through which ribbon flight 60 extends defines a separation zone into which the reaction products from flasher 12 are introduced through a conduit 64 which intercepts tubular member 42 in a tangential and downward direction. The conduit 64 is jacketed and heated through the nozzle 52 shown in connection therewith.

Beneath the separation zone, shaft 54 is enlarged and tapers gradually to its maximum diameter. In the same area, tubular member 44 narrows from its maximum to its minimum diameter to define a streamlined, frustoconical feed zone to which the molten polymer falls or is delivered by helical ribbon flight 60. From the feed zone, the polymer passes through a transfer zone and outwardly through the bottom of separator 14. Both the tapered and straight sections of shaft 54 in the feed and transfer zones respectively have attached thereto a constant diameter polymer transfer screw 66.

In operation, the steam-polymer separator 14 is maintained at an interior temperature above the melting point of the polymer by circulating the heat-transfer medium through the jacketing means. Molten polymer containing steam is introduced tangentially downward into the separator through conduit 64, near the bottom of the separating zone. Shaft 54 is driven in a counter-clockwise direction by a drive means (not shown) suitably connected to its upper end. As steam is disengaged from the mixture, it passes upward through the interior of ribbon flight 60 and exhausts through jacketed line 68 and valve 70 while, simultaneously, polymer is continuously scraped from the separator wall and urged downward into the feed section by the ribbon flight. The polymer is compressed, voiding any remaining steam, and fed to the transfer section by action of screw 66. In the transfer section, steam-free polymer is uniformly discharged from the separator by screw 66, the action and fitting of which also serve as an exit seal for the separator proper. Use of the steam-polymer separator in the manner described permits production of substantially steam-free polymer and attainment of physical equilibrium, i.e., steam liberation and escape, at a greater rate than attainment of chemical equilibrium, i.e., steam formation.

Separator 14 is mounted as a column in a substantially vertical or upright position in order to take advantage of the entire available separating area and to utilize gravitational influences on polymer flow. Capacity for separation depends primarily on the available space in the separation zone. A controlling factor is that the height of the separation zone should be sufficient to preclude polymer carryover through steam exhaust line 68. The spacing between shaft 54 and ribbon flight 60 should also be sufficient to permit the free passage of disengaged steam to exhaust line 68. A ribbon flight-to-wall distance of about 1/8 inch is sufficient to provide adequate scraper action and to prevent polymer gelation, degradation and the like in the separation zone. Instead of the helical ribbon flight 60, the scraper can take the form of a wheel consisting of a plurality of circumferentially disposed, equi-spaced blades each having an edge in close proximity to the tubular member 42 and each attached to shaft 54 by spokes. In general, the scraper should provide good polymer carry-down at the walls of the separator as well as minimum recirculation of the polymer, and should not unnecessarily disturb the steam-polymer interface.

The length of the transfer zone should be sufficient to isolate the system from spurious downstream pressure variations and to provide positive, uniform, controlled output characteristics. Screw 66 in effect causes a metered flow through the transfer zone. Such a controlled output is of particular importance in a balanced continuous polymerization process.

Valve 70 is placed in steam exhaust line 68 as a means for controlling the internal steam pressure. This permits operation of the separator at higher than atmospheric pressure. In a continuous system of the type disclosed herein, the polymer viscosity at the separator outlet depends on the pressure maintained in the separation zone. The following compilation of test results indicates the degree to which 66 nylon (polyhexamethylene adipamide) having a relative viscosity of about 18 and a steam content of about 44% by weight, when introduced into the separator, may be influenced by the position of valve 70:

| Steam pressure, p.s.i.g.: | Relative viscosity |
| --- | --- |
| 0 | 25 |
| 25 | 21 |
| 35 | 18.2 |

It should be noted that, as the steam pressure in the separator is decreased, the relative viscosity of the 66 nylon discharging therefrom is increased rapidly. Pressures lower than atmospheric may be used to obtain still higher relative viscosities. Under ordinary operating conditions, separator 14 is run at a small positive pressure to eliminate the possibility of atmospheric contamination.

Use of the steam-polymer separator, as above described, greatly facilitates the subsequent finishing operation. For example, where the production of polymers having a relative viscosity higher than that which may be obtained through equilibration with atmospheric steam is required, either an inert gas atmosphere or a partial vacuum must be employed in the conventional finisher. By the incorporation of separator 14 into the system, as shown in FIG. 1, the two-phase mixture of steam and liquid polymer which exits flashing reactor 12 is separated and only the polymer phase is delivered to finisher 16. Accordingly, the finishing operation is made far more economical in terms of retention time, inert gas consumption, and the like. For example, in the tests noted above, only 0.034 cubic foot of inert gas per pound of steam-free 66 nylon was required in the finisher to produce a polymer having a final relative viscosity of 60 whereas, without the separator, 2.4 cubic feet of inert gas per pound of the same polymer containing steam was required. In addition, longer finisher life and consistently high polymer quality result from the feeding of steam-free polymer to the finisher.

Since the polymer supplied by the separator is substantially free from steam, it can further react to a higher degree of polymerization in the transfer lines leading therefrom and, moreover, do so in a uniform manner. Thus, where lower viscosity polymer will suffice, as in textile applications, the finishing step of Heckert may be omitted in its entirety. By reducing the time required to attain a desired degree of polymerization or by avoiding a process step, polymer of appreciably improved quality is obtained because the possibility of gelation, degradation, etc., has been minimized.

The alternate embodiment shown fragmentarily in FIG. 3 is similar to the apparatus of FIG. 4, differing therefrom only in the details of the inlet pipe and the ribbon flight. The inlet pipe 64' extends into column 14' and terminates above the steam-polymer interface, i.e., the polymer level, in a position to discharge toward the center of the interface. This polymer level is generally maintained a few inches below the upper extent of ribbon flight 60'. The alternate embodiment of FIG. 3 is therefore adapted for inclusion in the system of FIG. 1 in much the same manner as described above in connection with the separator of FIG. 2 and differs therefrom primarily in the relocation of the shaft support assembly at the bottom of the separator column (FIG. 4), in the omission of the upper extent of shaft 54' and ribbon flight 60', and in the disposition of inlet pipe 64'. Ribbon flight 60' and screw 66' are integral and continuous through their length.

In operation, the two-phase mixture from flashing reactor 12 is discharged from pipe 64' which extends to within about one-half column diameter above the normal level of the polymer pool in the feed zone. In discharging from the pipe 64', the expanding steam carries the accompanying polymer only over the surface of the pool and a short distance up the column from the pool. Ribbon flight 60' extends upward from the interface only as far as is necessary to reach and scrape polymer carried to the column wall by the expanding steam and thus prevents polymer gelation, degradation and the like in the column. In operation, separator 14' is otherwise similar to the separator 14 shown in FIG. 2. Since there is no contact between the polymer and column wall in the separation zone, the need for a scraper in that zone is eliminated and the effective area available for separation is enlarged. In addition, the elimination of a rotating seal from the top of the separator 14' greatly simplifies the ever present problem of atmospheric contamination.

The apparatus embodiment shown in FIG. 4 has an inlet conduit 64" which passes through a jacketed cover plate 80 and discharges into a distributor head 81 having passages 82 from which liquid polymer issues in droplet, sheet or filamentary form, depending on the configuration of the passages. A conduit 73 communicates with the steam exhaust line 68" and has therein a valve 70" and a vacuum pump 74. Ribbon flight 60" terminates in the feed zone.

In operation, liquid polymer is introduced through conduit 64" and head 81. In passing through distributor head 81, the polymer flow is divided into several paths to thereby increase substantially its exposed surface area as it falls through the separation zone of column 14". In view of the distance through which the polymer falls between head 81 and the feed zone, the column 14" is suitable for use only in treating substantially steam-free polymer. For example, if the two-phase mixture from flashing reactor 12 were to be introduced directly into column 14", the expanding steam would carry some of the polymer over to the walls of the separation zone and form a gel. When substantially steam-free polymer, e.g., the output of the separator of FIG. 2 (or FIG. 3), is passed into column 14", the polymerization reaction continues, i.e., dissolved steam diffuses to the surface and vaporizes. Although the rate of diffusion is not fast, the time elapse is sufficient to facilitate the above-mentioned continuation of the polymerization reaction during the free fall of the polymer. The operation of pump 74 insures the maintenance of a partial vacuum in the column. Since there is no carry-over to the column walls, the question of polymer gelation and degradation in the separation zone does not arise and the need for a scraper in that zone is eliminated, thus enlarging the effective area available for separation. With the elimination of a rotating seal from the top of the apparatus, the possibility of atmospheric contamination is reduced substantially, as mentioned previously in connection with FIG. 3.

It is apparent therefore that apparatus of FIG. 4 has particular utility as a replacement for the finisher 16 (FIG. 1) in a continuous polymerization system which also includes a separator 14 or 14'. By its use, the retention time in the finishing step is further reduced and, at the same time, consistently high quality, high viscosity polymer is produced.

In all cases, suitable means should be provided for controlling the polymer level within the separator so as to avoid a condition of overload. For example, such control means could include an indicator responsive to the polymer level in the separator and coupled to suitable circuitry for controlling the speeds of shaft 54 and pump 24.

The apparatus disclosed herein is useful in the production of high viscosity polyamides in a rapid and continuous manner, and permits appreciable savings in the finishing operation. Although the disclosure has been directed primarily to the production of polyhexamethylene adipamide, the apparatus is equally useful with a wide range of polymers having varying steam contents. Aside from its use in continuous polyamidation reactions, the separator has general utility in the separation of volatile materials from any viscous liquid or semi-solid, especially those materials subject to thermal degradation. Other inherent advantages will occur readily to those skilled in the art and the extent of the invention is accordingly intended to be limited only by the scope of the appended claims.

I claim:

1. An apparatus for separating vapor from a viscous material, said apparatus comprising: a generally upright closed column having, from top to bottom, separation, feed and transfer zones; a material transfer conduit communicating with said separation zone and having its outlet disposed downwardly toward said feed zone; and transfer means including a driven shaft extending lengthwise of said column, screw feed means on the shaft in said transfer zone for moving material downwardly therethrough and a spiral flight attached to said shaft above said screw feed means by spokes, said flight being spaced from the shaft but in close proximity to the column to scrape material therefrom, said flight extending upwardly above the normal material level, there being a restricted exhaust port located adjacent the top of the column for vapor separated from said material and an outlet adjacent the bottom of the column for receiving material from said transfer means, said exhaust port being located a sufficient distance above said normal level to preclude material carry-over thereto.

2. The apparatus of claim 1 wherein is provided means in said exhaust port for controlling the pressure in said separation zone.

3. The apparatus of claim 2 wherein said flight is of greater radial extent than said screw feed means and wherein said column tapers conically toward said screw feed means in the feed zone.

4. The apparatus of claim 2 wherein said conduit extends downwardly into the separation zone and has an outlet dicharging outlet discharging toward the feed zone and wherein said driven shaft extends through the bottom of said column.

5. The apparatus of claim 2 wherein is provided a material distribution head coupled with said conduit in said separation zone, said head having a plurality of passages therethrough for dividing the flow of material, each passage having an outlet disposed downwardly into the separation zone.

6. An apparatus for separating steam from a molten polymer, said apparatus comprising: an upright hollow closed column having therein a separation zone and a feed-transfer zone beneath the separation zone, said column being surrounded by a jacket spaced therefrom, said jacket being provided with connections facilitating the flow of a heating fluid thereto; means in said separation zone for scraping polymer from said column and delivering it to said feed-transfer zone, said scraping means comprising a spiral flight extending upwardly beyond the normal polymer level; means in said feed-transfer zone for moving polymer downwardly therethrough; and a conduit communicating with said separation zone for discharging molten polymer downwardly therein toward the feed-transfer zone, said column being provided with a restricted exhaust port adjacent the top of the separation zone for steam separated from the polymer and an outlet for receiving substantially steam-free polymer from said feed-transfer zone, said exhaust port being located a sufficient distance above said normal level to preclude polymer carry-over thereto.

7. An apparatus for separating steam from a molten polymer, said apparatus comprising: an upright hollow closed column having therein a separation zone and a feed-transfer zone beneath the separation zone, said column being surrounded by a jacket spaced therefrom, said jacket being provided with connections facilitating the flow of a heating fluid thereto; means in said feed-transfer zone for moving polymer downwardly therethrough; a spiral flight situated above and connected to said polymer-moving means, said flight extending upwardly beyond the normal polymer level in said column and being in close proximity to the column to scrape polymer therefrom; and a polymer inlet conduit extending into the separation zone and downwardly toward the feed zone, said column being provided also with a restricted port adjacent the top thereof for exhausting steam separated from the polymer and an outlet for discharging polymer from the feed-transfer zone, said exhaust port being located a sufficient distance above said normal level to preclude polymer carry-over thereto.

8. An apparatus for separating steam from a molten polymer, said apparatus comprising: an upright hollow closed column having therein a separation zone and a feed-transfer zone beneath the separation zone, said column being surrounded by a jacket spaced therefrom, said jacket being provided with connections facilitating the flow of a heating fluid thereto; a polymer inlet conduit communicating with the separation zone adjacent the top of said column; a distribution head coupled with said conduit in said separation zone, said head having a plurality of passages therethrough for dividing the flow of polymer through the separation zone, each passage having an outlet discharging downwardly toward the feed-transfer zone; and means in said feed-transfer zone for moving polymer downwardly therethrough, said column being provided also with a restricted port adjacent the top thereof for exhausting steam separated from the polymer and an outlet for discharging polymer from the feed transfer zone, said polymer-moving means having connected thereto a spiral flight extending upwardly above the normal level of polymer, said flight being in close proximity to the column to scrape polymer therefrom, said exhaust port being located a sufficient distance above said level to preclude polymer carry-over thereto.

9. The apparatus of claim 8 wherein is provided a vacuum pump in said exhaust port for maintaining a partial vacuum in said separation zone.

10. An apparatus for separating vapor from a viscous material, said apparatus comprising: an upright hollow closed column having, from top to bottom, separation, feed and transfer zones; an inlet conduit extending into and downwardly in said separation zone to a point spaced from said feed zone; a driven shaft extending through the bottom of said column and into the feed zone, said shaft and the terminal length of said conduit being substantially coaxial; scraper means attached to said shaft in the feed zone; and screw feed means on the shaft in said transfer zone, said column being conically tapered in the feed zone and provided with a restricted port adjacent the top of the separation zone for exhausting vapor separated from the material introduced through said conduit, said port being located a sufficient distance above said point to preclude material carry-over thereto.

References Cited in the file of this patent

UNITED STATES PATENTS

| | | |
|---|---|---|
| 1,971,632 | Anderson | Aug. 28, 1934 |
| 2,078,565 | Durst et al. | Apr. 27, 1937 |
| 2,626,856 | Alles | Jan. 27, 1953 |
| 2,665,197 | Rowland | Jan. 5, 1954 |
| 2,689,839 | Heckert | Sept. 21, 1954 |
| 2,709,642 | Mann et al. | May 31, 1955 |
| 2,833,750 | Vickers | May 6, 1958 |
| 2,840,547 | Stump | June 24, 1958 |
| 2,880,197 | Coleman | Mar. 31, 1959 |